US007593892B2

(12) United States Patent
Balk et al.

(10) Patent No.: US 7,593,892 B2
(45) Date of Patent: Sep. 22, 2009

(54) FINANCIAL INSTITUTION PORTAL SYSTEM AND METHOD

(75) Inventors: Michael A. Balk, Centerport, NY (US); Daniel A. Cejudo Bruno, Brooklyn, NY (US); Jennifer E. Nicol, Oxted (GB)

(73) Assignee: Standard Chartered (CT) PLC, London (GB)

( * ) Notice: Subject to any disclaimer, the term of this patent is extended or adjusted under 35 U.S.C. 154(b) by 308 days.

(21) Appl. No.: 11/163,081

(22) Filed: Oct. 4, 2005

(65) Prior Publication Data

US 2006/0089894 A1   Apr. 27, 2006

Related U.S. Application Data

(60) Provisional application No. 60/616,062, filed on Oct. 4, 2004.

(51) Int. Cl.
*G06Q 40/00* (2006.01)
(52) U.S. Cl. .......................................... 705/38; 705/35
(58) Field of Classification Search .................. 705/40, 705/38, 35, 30
See application file for complete search history.

(56) References Cited

U.S. PATENT DOCUMENTS

| | | | |
|---|---|---|---|
| 4,694,397 A | 9/1987 | Grant et al. | |
| 4,736,294 A | 4/1988 | Gill et al. | |
| 4,751,640 A | 6/1988 | Lucas et al. | |
| 4,823,265 A | 4/1989 | Nelson | |
| 4,876,648 A | 10/1989 | Lloyd | |
| 5,025,138 A | 6/1991 | Cuervo | |
| 5,151,948 A | 9/1992 | Lyke et al. | |
| 5,239,462 A | 8/1993 | Jones et al. | |
| 5,262,941 A | 11/1993 | Saladin et al. | |
| 5,262,942 A | 11/1993 | Earle | |
| 5,274,547 A | 12/1993 | Zoffel et al. | |
| 5,383,113 A | 1/1995 | Kight et al. | |
| 5,611,052 A | 3/1997 | Dykstra et al. | |
| 5,615,408 A | 3/1997 | Johnson et al. | |
| 5,636,117 A | 6/1997 | Rothstein | |

(Continued)

FOREIGN PATENT DOCUMENTS

WO   03093964   11/2003

(Continued)

OTHER PUBLICATIONS

Linthicum D: "B2B Application Integration, Portal-Oriented B2B Application Integration" B2B Application Integration: E-Business-Enable Your Enterprise, Aug. 1, 2001, pp. 91-104, XP002292995.

*Primary Examiner*—James P Trammell
*Assistant Examiner*—Jamie H Swartz
(74) *Attorney, Agent, or Firm*—Snell & Wilmer L.L.P.

(57) ABSTRACT

Systems and methods utilizing a portal on a single computer platform for improving risk assessment and business reporting are disclosed. The portal integrates at least two financial information resources such as, for example, an electronic credit report (eCR) database, an electronic know your customer (eKYC) database, a client business management information system, and a customer profitability system large area network. The eCR database includes a link to an exposure database, a credit rating database, and/or an intelligence database. The eKYC database includes an anti-money laundering scoring module, and/or a standard KYC form or an enhanced KYC form.

20 Claims, 8 Drawing Sheets

U.S. PATENT DOCUMENTS

| | | | |
|---|---|---|---|
| 5,671,282 A | 9/1997 | Wolff et al. | |
| 5,677,955 A | 10/1997 | Doggett et al. | |
| 5,689,651 A | 11/1997 | Lozman | |
| 5,694,595 A | 12/1997 | Jacobs et al. | |
| 5,696,907 A | 12/1997 | Tom | |
| 5,699,527 A | 12/1997 | Davidson | |
| 5,699,528 A | 12/1997 | Hogan | |
| 5,706,442 A | 1/1998 | Anderson et al. | |
| 5,710,889 A | 1/1998 | Clark et al. | |
| 5,721,908 A | 2/1998 | Lagarde et al. | |
| 5,742,775 A | 4/1998 | King | |
| 5,745,706 A | 4/1998 | Wolfberg et al. | |
| 5,774,882 A | 6/1998 | Keen et al. | |
| 5,787,403 A | 7/1998 | Randle | |
| 5,787,404 A | 7/1998 | Fernandez-Holmann | |
| 5,797,133 A | 8/1998 | Jones et al. | |
| 5,802,501 A | 9/1998 | Graff | |
| 5,870,721 A | 2/1999 | Norris | |
| 5,872,915 A | 2/1999 | Dykes et al. | |
| 5,875,435 A | 2/1999 | Brown | |
| 5,875,437 A | 2/1999 | Atkins | |
| 5,878,403 A | 3/1999 | DeFrancesco et al. | |
| 5,878,404 A | 3/1999 | Stout, Jr. et al. | |
| 5,884,288 A | 3/1999 | Chang et al. | |
| 5,918,217 A | 6/1999 | Maggioncalda et al. | |
| 5,930,776 A | 7/1999 | Dykstra et al. | |
| 5,940,811 A | 8/1999 | Norris | |
| 5,940,812 A | 8/1999 | Tengel et al. | |
| 5,950,179 A | 9/1999 | Buchanan et al. | |
| 5,966,699 A | 10/1999 | Zandi | |
| 5,991,750 A | 11/1999 | Watson | |
| 5,995,947 A | 11/1999 | Fraser et al. | |
| 6,014,645 A | 1/2000 | Cunningham | |
| 6,018,723 A | 1/2000 | Siegel et al. | |
| 6,023,683 A | 2/2000 | Johnson et al. | |
| 6,023,687 A | 2/2000 | Weatherly et al. | |
| 6,029,147 A | 2/2000 | Horadan et al. | |
| 6,029,149 A | 2/2000 | Dykstra et al. | |
| 6,049,784 A | 4/2000 | Weatherly et al. | |
| 6,061,448 A | 5/2000 | Smith et al. | |
| 6,072,481 A | 6/2000 | Matsushita et al. | |
| 6,073,117 A | 6/2000 | Oyanagi et al. | |
| 6,088,686 A | 7/2000 | Walker et al. | |
| 6,105,007 A | 8/2000 | Norris | |
| 6,112,190 A | 8/2000 | Fletcher et al. | |
| 6,125,391 A | 9/2000 | Meltzer et al. | |
| 6,135,349 A | 10/2000 | Zirkel | |
| 6,148,293 A | 11/2000 | King | |
| 6,154,729 A | 11/2000 | Cannon et al. | |
| 6,185,543 B1 | 2/2001 | Galperin et al. | |
| 6,212,549 B1 | 4/2001 | Page et al. | |
| 6,243,722 B1 | 6/2001 | Day et al. | |
| 6,279,042 B1 | 8/2001 | Ouchi | |
| 6,314,425 B1 | 11/2001 | Serbinis et al. | |
| 6,357,010 B1 | 3/2002 | Viets et al. | |
| 6,360,254 B1 | 3/2002 | Linden et al. | |
| 6,381,579 B1 | 4/2002 | Gervais et al. | |
| 6,381,610 B1 | 4/2002 | Gundewar et al. | |
| 6,385,594 B1 | 5/2002 | Lebda et al. | |
| 6,385,644 B1 | 5/2002 | Devine et al. | |
| 6,393,423 B1* | 5/2002 | Goedken | 707/10 |
| 6,397,261 B1 | 5/2002 | Eldridge et al. | |
| 6,405,181 B2 | 6/2002 | Lent et al. | |
| 6,412,073 B1 | 6/2002 | Rangan | |
| 6,438,526 B1 | 8/2002 | Dykes et al. | |
| 6,452,689 B1 | 9/2002 | Srinivasan | |
| 6,453,339 B1 | 9/2002 | Schultz et al. | |
| 6,487,599 B1 | 11/2002 | Smith et al. | |
| 6,493,760 B1 | 12/2002 | Pendlebury et al. | |
| 6,505,176 B2 | 1/2003 | DeFrancesco, Jr. et al. | |
| 6,515,988 B1 | 2/2003 | Eldridge et al. | |
| 6,516,411 B2 | 2/2003 | Smith | |
| 6,523,063 B1 | 2/2003 | Miller et al. | |
| 6,529,956 B1 | 3/2003 | Smith et al. | |
| 6,678,827 B1 | 1/2004 | Rothermel et al. | |
| 6,751,600 B1 | 6/2004 | Wolin | |
| 6,772,146 B2 | 8/2004 | Khemlani et al. | |
| 6,965,865 B2* | 11/2005 | Pletz et al. | 705/1 |
| 7,249,074 B1* | 7/2007 | Land et al. | 705/34 |
| 7,376,576 B2* | 5/2008 | Dimitruk et al. | 705/7 |
| 2001/0027440 A1 | 10/2001 | Tanaka et al. | |
| 2002/0007341 A1 | 1/2002 | Lent et al. | |
| 2002/0019788 A1 | 2/2002 | Stehle et al. | |
| 2002/0049655 A1 | 4/2002 | Bennett et al. | |
| 2002/0049713 A1* | 4/2002 | Khemlani et al. | 707/1 |
| 2002/0055835 A1 | 5/2002 | Carcoba Olivares et al. | |
| 2002/0095651 A1 | 7/2002 | Kumar et al. | |
| 2002/0103748 A1 | 8/2002 | Abhyanker et al. | |
| 2002/0116305 A1 | 8/2002 | Abhyanker | |
| 2002/0133494 A1* | 9/2002 | Goedken | 707/10 |
| 2002/0138417 A1* | 9/2002 | Lawrence | 705/38 |
| 2002/0161707 A1* | 10/2002 | Cole et al. | 705/42 |
| 2003/0061232 A1* | 3/2003 | Patterson | 707/104.1 |
| 2003/0117443 A1* | 6/2003 | Langner et al. | 345/810 |
| 2003/0126050 A1 | 7/2003 | Theiss et al. | |
| 2003/0130918 A1 | 7/2003 | Polk | |
| 2003/0208412 A1 | 11/2003 | Hillestad et al. | |
| 2003/0229580 A1* | 12/2003 | Gass et al. | 705/38 |
| 2004/0030639 A1 | 2/2004 | Lebda et al. | |
| 2004/0054610 A1* | 3/2004 | Amstutz et al. | 705/36 |
| 2004/0078320 A1 | 4/2004 | DeFrancesco et al. | |
| 2004/0093343 A1 | 5/2004 | Lucas et al. | |
| 2004/0111359 A1 | 6/2004 | Hudock | |
| 2004/0128186 A1 | 7/2004 | Breslin et al. | |
| 2004/0133521 A1 | 7/2004 | Hedy | |
| 2005/0027675 A1* | 2/2005 | Schmitt et al. | 707/1 |
| 2005/0084152 A1* | 4/2005 | McPeake et al. | 382/173 |
| 2005/0119919 A1* | 6/2005 | Eder | 705/4 |
| 2005/0267827 A1* | 12/2005 | Grant et al. | 705/35 |
| 2006/0064436 A1* | 3/2006 | Fowler et al. | 707/104.1 |
| 2007/0106892 A1* | 5/2007 | Engberg | 713/168 |

FOREIGN PATENT DOCUMENTS

WO    03098460    11/2003

\* cited by examiner eCredit Form

Client   Facilities   Exposure   RM Comments   Financials   Analysis   Approval   Ratings   Allocation:   Group Limit Nova Kreditna Banka Maribor DO

Client Information

| | | | |
|---|---|---|---|
| Bank Name: | Nova Kreditna Banka Maribor DO | Group Name: | Stand Alone Credit |
| Percentage Held: | | | |
| Review Type: | Amend | Expiry Date: | 11/30/2003 |
| Client Purpose | | Group Purpose: | |
| FIG Type: | | Bank Established: | |
| Credit Relationship Since: | | Credit Office: | United Kingdom |
| RM Location: | Vienna | ORR: | 4 |
| RM Region: | ENEA | CIF: | 091000000929 |

Risk Information

| | | | |
|---|---|---|---|
| ORR: | 4 | Country of Risk: | Slovenia |
| Previous ORR: | 4 | ORR: | 4 |
| Reason for ORR Change: | | Country of Domicile: | Slovenia |
| Tier: | | Watchlist: | No |
| Policy Exception: | | | |

Bank Information

Background/Market Position:

*Sidebar:* CR Workflow, Reporting, Edit, Reference, Useful Links

| CR Workflow | eKYC Form |
|---|---|
| Work in Process<br>New Credit<br>Edit Approved Credit<br>Unit Management | Primary Regulator [                    ]<br>Other Regulators if Applicable [          ]<br>Year of Incorporation or License Granted [     ]<br>Type of License or Legal Status   [ General Banking License ] |
| KYC | Restrictions on services related to client residence or currency<br>O Foreign Customers Only<br>O Provides Services only in non-local currency |
| Peer Group<br>Client Reporting<br>Financial Institutions<br>Workflow Report<br>Excel Pivot Table<br>Country Strategy<br>Bank Market Pager | ☐ Central Bank Listing of currently authorized institutions<br>☐ Third Party Credit Rating Service<br>☐ Audited Financial Statements<br>☐ Copy of License/Legal status obtained/reviewed<br>☐ Other Regulatory Body<br>If other, please specify [                    ]<br>☐ Regulatory enforcement action [        ]<br><br>Enforcement Agency Name: [              ]<br>Note Type and Summarize Nature:<br>☐ Anti-Money Laundering related |
| Edit | ☐ Other |
| Country Strategy<br>Bank Market Paper<br>Call Report | Tax ID Number: [           ]<br>☐ Tax ID number is intentionally left blank<br>☐ Government issued documentation certifying the existence of the institution has been provided and retained for the file. |
| Reference | |
| Credit Policy Manual<br>eKYC Help<br>Credit Authority Matrix<br>MFI/LRLE Limits | Patriot Act Certification<br>Required O Yes O No<br>Received O Yes O No<br>Date Received & Accepted [ mm/dd/yy ] |
| Useful Links | Review and indicate whether institution maintains reasonable written policies and procedures<br>☐ Code of Conduct/Ethics |
| Rating Agencies | ☐ Money laundering prevention program and training<br>☐ Customer I.D. policy/No anonymous relationships<br>☐ Suspicious activity recording policy<br>Compliance Officer Name: [         ]<br><br>Compliance Officer Telephone No. [          ]<br><br>Products, Services and Customer Base☐<br>☐ Exchange house/Money service business Banks (hosted correspondents)<br>☐ Private Banks<br>☐ Payable through Accounts<br>Follow-up Required O Yes O No<br>Follow-up Action Plan for temporary waivers granted or special handling or monitoring |

Figure 4

FINANCIAL INSTITUTION PORTAL SYSTEM AND METHOD

CROSS-REFERENCE TO RELATED APPLICATIONS

This application claims priority to, and the benefit of, U.S. Provisional Application No. 60/616,062 filed Oct. 4, 2004, which is hereby incorporated by reference, in it entirety.

FIELD OF INVENTION

The invention relates to portal systems and methods to facilitate the integration of various credit and compliance information resources.

BACKGROUND OF INVENTION

In the United States, Customer Due Diligence (CDD) is a requirement of the Patriot Act and the Bank Secrecy Act. The Patriot Act requires due diligence by all domestic financial institutions that maintain, administer, or manage private banking accounts or correspondent accounts in the United States for all "non-United States persons." As such, United States institutions must have appropriate, specific, and where necessary, enhanced due diligence policies, procedures and controls that are reasonably designed to detect and report instances of money laundering through those accounts.

Furthermore, The Patriot Act requires additional measures for correspondent accounts of foreign banks that either are licensed by particular jurisdictions or operate under offshore banking licenses. The particular jurisdictions specified by the Act are (1) jurisdictions designated by intergovernmental groups (such as the Financial Action Task Force) as non-cooperative with international anti-money laundering standards, and (2) jurisdictions designated by the U.S. Treasury Department as warranting special measures due to money laundering concerns. For correspondent accounts of foreign banks operating under the licenses described above, a U.S. financial institution has the following additional obligations: if shares of the correspondent foreign bank are not publicly traded, the U.S. financial institution must take reasonable steps to (1) identify each of the owners of the foreign bank, and (2) identify the nature and extent of each owner's interest.

The Bank Secrecy Act authorizes the U.S. Treasury Department to require financial institutions to maintain records of personal financial transactions that "have a high degree of usefulness in criminal, tax and regulatory investigations and proceedings." Under the Bank Secrecy Act, the U.S. Treasury Department has the authorization to require a financial institution to report (in a "Suspicious Activity Report") any "suspicious transaction relevant to a possible violation of law or regulation." Suspicious Activity Reports are filed secretly, without the consent or knowledge of bank customers, and any time a financial institution decides that a transaction is "suspicious."

From a financial institution's point of view, the cornerstone of a strong Anti-Money Laundering and Bank Secrecy Act (AML/BSA) compliance program is the adoption and implementation of comprehensive customer policies, procedures and processes for all customers, particularly those that present a high risk for money laundering and terrorist financing. The objective of CDD procedures should be to enable the financial institution to predict with relative certainty the types of transactions in which a customer is likely to engage. These procedures assist the financial institution in determining when transactions are potentially suspicious. The concept of CDD begins with verifying the customer's identity and assessing the risks associated with that customer.

Furthermore, procedures should also include enhanced CDD for high-risk customers and ongoing due diligence of the customer base. Effective CDD policies, procedures and processes provide the critical framework that enables the financial institution to comply with regulatory requirements and to report suspicious activity.

CDD policies, procedures and processes are critical to the financial institution because they can aid in: (1) detecting and reporting unusual or suspicious transactions that potentially expose the financial institution to financial loss, increased expenses or reputational risk, thereby avoiding criminal exposure from persons who use or attempt to use the financial institution's products and services for illicit purposes; and (2) adhering to safe and sound banking practices. As such, the financial institution's AML/BSA policies, procedures and processes should include CDD guidelines that: (1) are commensurate with the financial institution's AML/BSA risk profile, paying particular attention to high-risk customers; (2) contain a clear statement of management's overall expectations and establish specific staff responsibilities, including who is responsible for reviewing or approving changes to a customer's risk rating or profile, as applicable; (3) ensure that the financial institution possesses sufficient customer information to implement an effective suspicious activity monitoring system; (4) provide guidance for documenting an analysis associated with the due diligence process, including guidance for resolving issues when insufficient or inaccurate information is obtained; and (5) ensure the financial institution maintains current customer information.

Furthermore, the financial institution's management should have a thorough understanding of the money laundering or terrorist financing risks of the financial institution's customer base. Under this approach, the financial institution should obtain information at account opening sufficient to develop an understanding of normal and expected activity for the customer's occupation or business operations. Much of the CDD information can be confirmed through an information-reporting agency, banking references (for larger accounts), correspondence and telephone conversations with the customer, and visits to the customer's place of business. Additional steps may include obtaining third-party references or researching public information (e.g., on the Internet or commercial databases). CDD procedures should include periodic monitoring of the customer relationship to determine whether there are substantive changes to the original CDD information (e.g., change in employment or business operations).

Customers that pose high money laundering or terrorist financing risks present increased exposure to financial institutions, so due diligence policies, procedures, and processes should be enhanced as a result. Enhanced due diligence for high-risk customers is especially critical in understanding their anticipated transactions and implementing a suspicious activity monitoring system that reduces the financial institution's reputation, compliance, and transaction risks. As such, high-risk customers and their transactions should be reviewed more closely at account opening and more frequently throughout the term of their relationship with the financial institution. Guidance to identify high-risk customers may be found in the core overview section Financial institutions typically administer the above critical risk management and regulatory mandated policies, procedures and processes on department-developed databases. Different departments (e.g., credit risk management and compliance) typically create, maintain and access their own databases so that client risk information is often fragmented. Furthermore, because different departments are creating, maintaining, and/or accessing different databases, it is a time-consuming task to collate all of the information needed to perform an analysis of risk characteristics or effectiveness measures. Moreover, important information is often not transmitted to other departments and/or the information may become "lost."

Currently, compliance approval status is not readily accessible by relationship managers. As such, account opening may be unnecessarily delayed pending confirmation of know your customer (KYC) status. In addition, KYC information is generally maintained in Words format in multiple booking centers, often resulting in input duplication and redundant record keeping, which further results in information lacking quality and/or quantity. Therefore, a need exists for unified, high quality information that is accessible to multiple departments (and users) throughout a network, such that a database serves as a central information resource for complying with critical risk management and regulatory mandated policies, procedures and processes.

SUMMARY OF INVENTION

The invention facilitates the integration of financial information resources and includes a web server coupled to an application server, wherein the application server includes a portal to at least two of: (a) an electronic credit report (eCR) database, (b) an electronic know your customer (eKYC) database, (c) a client business management information system (CBMIS), and (d) a customer profitability system large area network (CPS LAN). In one embodiment, the system includes at least one additional feature such that the application server includes a portal to at least three of the (a), (b), (c), and (d) components. In another embodiment, the system includes at least two additional features such that the application server includes a portal to each of the (a), (b), (c), and (d) components.

When the application server includes a portal to an eCR database, in one embodiment, the eCR database includes at least one of (i) an exposure database, (ii) a credit rating database, and (iii) an intelligence database. In other embodiments, the eCR includes two or more of the (i), (ii), and (iii) components.

When the application server includes a portal to the eKYC database, the eKYC database includes a link to at least one of a geographic and bank anti-money laundering (AML) scoring model, a standard KYC form, and an enhanced KYC form. In one embodiment, the eKYC database includes a link to two or more of the geographic and bank AML scoring module, standard KYC form, and enhanced KYC form.

BRIEF DESCRIPTION OF THE DRAWINGS

A more complete understanding of the present invention may be derived by referring to the detailed description and claims when considered in connection with the drawing Figures, where like reference numbers refer to similar elements throughout the Figures.

FIGS. 2 and 3 illustrate various exemplary screen shots and features of an eCR database according to an embodiment of the invention;

FIG. 4 illustrates an exemplary screen shot and features of a standard know your customer (KYC) form according to an embodiment of the invention;

DETAILED DESCRIPTION

The detailed description of exemplary embodiments of the invention herein makes reference to the accompanying drawings and screenshots, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation. For example, the steps recited in any of the method or process descriptions may be executed in any order and are not limited to the order presented. For the sake of brevity, conventional data networking, application development and other functional embodiments of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

Moreover, as used herein, the terms "customer", "client", "financial institution", "consumer", "business", "bank" or "merchant" may be used interchangeably with each other, and each shall mean any person, entity, machine, hardware, software or business.

Figure 1:
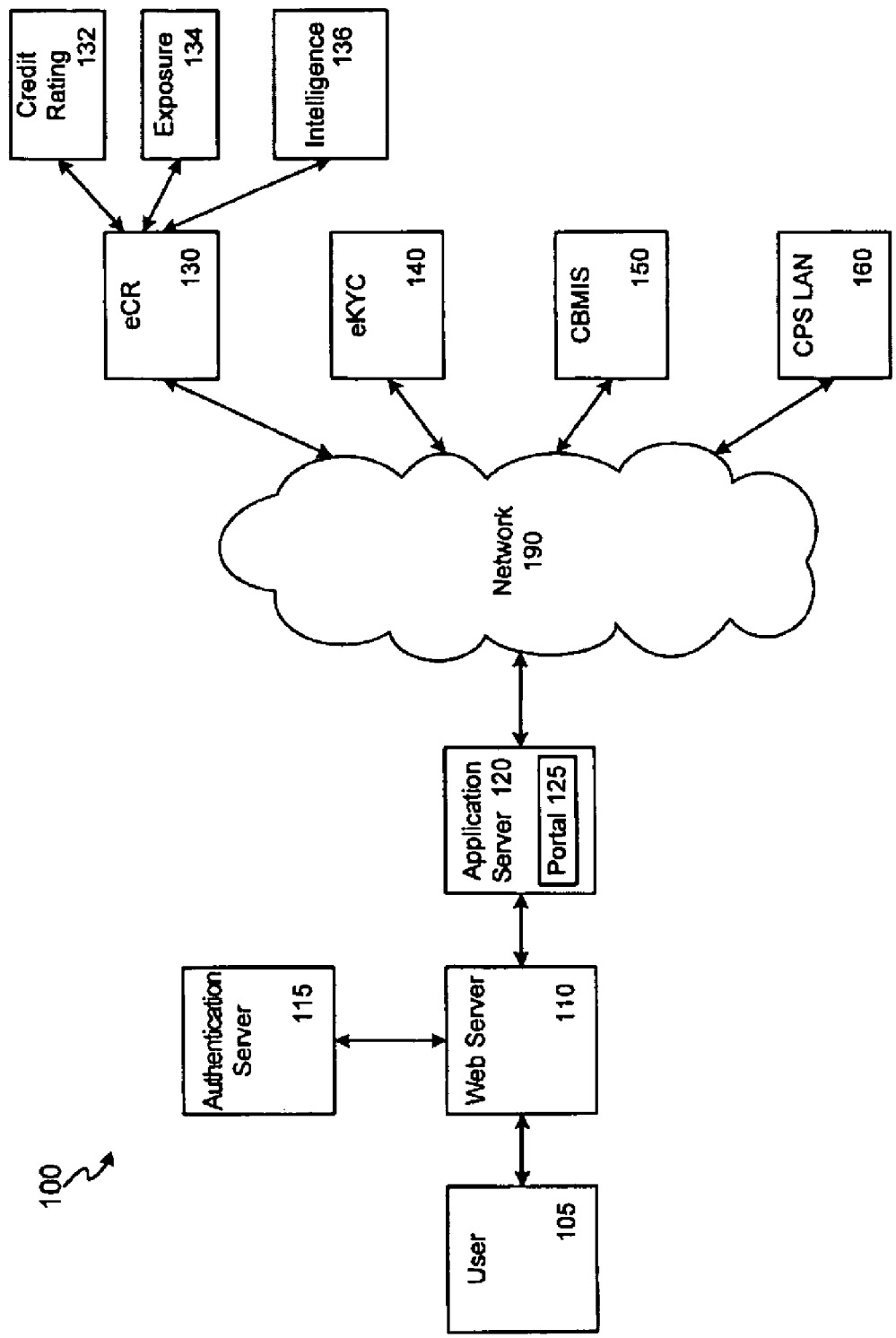
FIG. 1 is a block diagram of an exemplary system for integrating financial information resources onto a single computer platform according to an embodiment of the invention.

Turning now to the figures, FIG. 1 is a block diagram of a system 100 configured to integrate financial information resources onto a single computer platform such that there is universal access to the same information within an entity to facilitate uniform rules/procedures throughout each department and branch (including regional outposts) within the entity. As one skilled in the art will appreciate, a single computer platform may include one or more computers, components, and/or computer systems. In one embodiment, system 100 includes a web server 110, which may comprise any hardware and/or software suitably configured to facilitate communications between a user 105 and one or more system 100 components. User 105, in various embodiments, includes one or more users in a financial institution who participate in a credit decisioning process, including, for example, a global relation manager (GRM), a member of a financial institution's Compliance/Credit Utility (MCCU), a Credit Analyst (CA), a Credit Officer (CO), a Compliance Officer (COMPO), a relationship manager (RM), and the like.

Web server 110, in one embodiment of the invention, is configured to transmit data to user 105 within markup language documents. In various embodiments, web server 110 operates as a single entity in a single geographic location, as separate computing components located together and/or in separate geographic locations. As used herein, the term "transmit" includes, for example, sending electronic data from one system component to another over a network connection. Additionally, as used herein, the term "data" includes, for example, encompassing information such as commands, queries, files, data for storage, and the like in digital or any other form.

To control access to web server 110 or any other component of system 100, web server 110, in one embodiment, invokes an authentication server 115 in response to submission of user 105 authentication credentials received at web server 110. Authentication server 115 includes any hardware and/or software suitably configured to receive authentication credentials, encrypt and decrypt credentials, authenticate credentials, and grant access rights according to user 105 predefined privileges attached to the credentials. In one embodiment, authentication server 115 grants varying degrees of application and data level access to user 105. For example, a credit manager may be granted access to input and/or modify credit data while a systems engineer is limited to viewing credit assessments and reports.

System 100, in an exemplary embodiment, also includes an application server 120 interfaced with web server 110. Application server 120 comprises any hardware and/or software suitably configured to serve applications and data to user 105, and is interfaced with web server 110, or any number of other servers, databases and/or components of system 100, by any means known in the art or discussed herein, including a LAN/WAN, for example. Application server 120 may also serve as a conduit between user 105 and the sub systems and components of system 100.

In an exemplary embodiment, application server 120 includes a portal 125 to one or more applications. Portal 125 may include any hardware and/or software suitably configured to allow user 105 to gain access to applications (i.e., resources) including various types of financial information. Portal 125 is a tool for organizing and navigating through financial information resources via a network 190 (discussed below). Furthermore, Portal 125 integrates a credit and compliance process to reduce input duplication and configured to generate a single client risk profile incorporating information on ownership, management, financial performance, political environment, regulatory issues, and economic commentary on markets. Portal 125, in one embodiment, may include one or more web pages that act as a starting point for using the Internet or Internet-based services. In another embodiment, portal 125 acts as a starting point for employees or associates of an organization to access the applications including the various types of financial information. As such, portal 125 includes web server software, wherein the web server software acts as a platform for deploying portal 125.

Portal 125, in one exemplary embodiment, includes a suite (not shown) of complementary applications (hereinafter, "suite") aimed at improving business reporting quality, efficiency, and accessibility. The suite includes access to an electronic credit report (eCR) database 130 (e.g., for a financial institution Group) via portal 125. eCR database 130 may be any hardware and/or software suitably configured to provide access to the same financial information by one or more persons or departments within a financial institution, such that the financial institution may make a decision whether to extend credit to a customer based on one or more persons or departments accessing and analyzing the same financial information. eCR database 130, in one embodiment, includes financial reports and analysis and/or any other financial information about a customer that may facilitate an electronic credit approval process. In another embodiment, eCR database 130 advises credit limits to users (e.g., user 105), and archives approved eCRs containing client and market analysis, credit limits, and internal obligor and country risk ratings.

eCR database 130, in an exemplary embodiment, is configured to access a credit rating database 132 (e.g., Fitch Global Financial and Rating database available from Fitch Ratings, Ltd. of New York, N.Y.) to import ratings data regarding a customer. As such, credit rating database 132 may be any credit rating database known in the art or developed in the future.

In other exemplary embodiments, eCR database 130 is configured to access an exposure database 134 to output credit exposure reporting, including return on exposure data by customer, country, region, and/or the like. As such, exposure database 134 may be any exposure database known in the art or developed in the future.

eCR database 130, in other embodiments, is configured to access an intelligence database 136 (e.g., Economist Unit Country Reports database available from The Economist Intelligence Unit, Ltd. Of London, England) to allow a person to gather information (e.g., economic statistics, government information, stability, projected growth analysis, and the like) about a country where a particular customer is operating. As such, intelligence database 136 may be any intelligence database known in the art or developed in the future.

In another exemplary embodiment, the suite includes access to an electronic Know Your Customer (eKYC) database 140 via portal 125. eKYC database 140 is any hardware and/or software suitably configured to facilitate an electronic Know Your Customer (KYC) approval process (e.g., due diligence process). In one exemplary embodiment, eKYC database 140 includes one or more KYC forms and a geographic and bank anti-money laundering (AML) scoring module.

The KYC form (discussed in further detail with reference to FIGS. 4 and 5 below) may include, for example, a standard form, an enhanced form, an approval form, and/or any other type of KYC form, whether or not of a proprietary nature. A standard KYC form, in one embodiment, includes a format such that the financial entity operating eKYC database 140 is in compliance with the due diligence requirements of one or more jurisdictions where the financial entity is operating, intends on operating, and/or where the customer operates/intends on operating. The enhanced form and/or other forms may be specifically tailored for the individual needs/desires of the entity operating eKYC database 140 and system 100 as a whole, and may include stricter requirements and/or more detailed information relating to the customer than is generally required by the entity operating system 100. In other embodiments, eKYC database 140 is configured to advise user 105 of the KYC status of a customer (e.g., high risk, high/moderate risk, moderate risk, low risk, and the like). Furthermore, eKYC database 140 is configured to archive approved KYC due diligence forms, and/or facilitate viewing of information and approval status from a single warehouse. As such, eKYC database 140 permits access to information to multiple users including, for example, relationship managers (RMs), compliance personnel, and operations personnel in each booking center and marketing location.

The AML scoring module is suitably configured to calculate and store an AML score computed for an entity and/or by including one or more inquiries relating to the entity and/or country and assigning a score (e.g., a numerical, alphanumeric value, or the like) to each inquiry based upon the response entered. The scores are summed together to obtain a total AML score, which may be translated to a classification (e.g., high, high-medium, medium, medium-low, low, and the like). In one embodiment, the AML score/classification is for the entity, while in other embodiments the AML score/classification may be for the country where an entity's headquarters is located and/or where any subsidiaries, branches, and the like are located, or for the entity and the country combined.

In one exemplary embodiment, the AML scoring module may include one or more of the inquiries set forth below and assign the corresponding score to the response.

| CATEGORY | INQUIRY | RESPONSE | SCORE |
|---|---|---|---|
| Customer Information | Institution Type | Commercial Bank | 10 |
| | | Broker Dealer | 25 |
| | | Exchange House | 200 |
| | | Offshore Bank | 500 |
| | | Central Bank | 0 |
| | | Private Bank | 100 |
| | | Securities Investment Trust | 100 |
| | | Prime Broker | 25 |
| | | Fortune 500 | 25 |
| | | Multi-National | 50 |
| | | Insurance Company | 50 |
| Customer Information | Client Premises Visited Within Last 12 Months? | Yes | 0 |
| | | No | 50 |
| Customer Information | Compliance Check? | Yes | 0 |
| | | No | Default to High Risk |
| Customer Information | New Customer? | Yes | 25 |
| | | No | 0 |
| Customer Information | Length of Relationship | <3 yrs | 10 |
| | | >3 yrs | 0 |

| CATEGORY | INQUIRY | RESPONSE | SCORE |
|---|---|---|---|
| Regulatory | Suspicious Activity Reporting? | Yes | 100 |
| | | No | 0 |
| Regulatory | License granted | <1 yr | 100 |
| | | 1-3 yrs | 50 |
| | | >3 yrs | 0 |
| Regulatory | License/ Legal Status corroborated by | Central Bank Listing | 0 |
| | | Third Party Credit Rating Service | 50 |
| | | Audited Financial Statements | 50 |
| | | Copy of License Obtained | 0 |
| | | Name Other: | 50 |
| Regulatory | Products Services and Customer Base | Exchange House | 100 |
| | | Banks (nested correspondents) | 100 |
| | | Private Banking | 50 |
| | | Payable Through Accounts | 100 |
| | | Walk in Payment Services | 75 |
| | | Anonymous Accounts | 100 |
| | | US Banks not Registered with Financial Crimes Enforcement Network | 100 |
| | | Diplomats/Political Entities | 200 |
| Regulatory | License | General | 0 |
| | | Full | 0 |
| | | Savings | 100 |
| | | Bank/Association | |
| | | Offshore Location | 300 |
| | | Limited Liability Company | 300 |
| | | Trust Company | 100 |
| | | Corporation | 100 |
| | | Other | 200 |

-continued

| CATEGORY | INQUIRY | RESPONSE | SCORE |
|---|---|---|---|
| Regulatory | Regulatory Enforcement Action | <1 yr | 100 |
| | | 1-3 yrs | 50 |
| | | 3-5 yrs | 25 |

-continued

| CATEGORY | INQUIRY | RESPONSE | SCORE |
|---|---|---|---|
| | | >5 yrs | 0 |
| Management | Comments on Background of senior management | Positive/Neutral | 0 |
| | | Negative | 100 |
| | | Not found | 50 |

| CATEGORY | INQUIRY | RESPONSE | SCORE |
|---|---|---|---|
| Open Issues | Open Issues? | Yes | 100 |
| | | No | 0 |
| Ownership | Group Structure Bank/Non-Bank Ownership | Non-Bank | 50 |
| | | Bank | 0 |
| Ownership | Major ownership changes in past year? | Yes | 50 |
| | | No | 0 |
| Ownership | Publicly Traded? | Yes | 0 |
| | | No | 50 |

To determine the AML score for a customer, the corresponding score for the inquiries above are added together. For example, if the customer is a broker dealer, the response to this inquiry receives a score of 25. Likewise, if the premises have not been visited within the last 12 months, this response receives a score of 50. Furthermore, if this is a new customer a score of 25 is added to the total. Moreover, if there are negative comments found on the background of senior management, this response will receive a score of 100. This process is repeated for each inquiry and the corresponding scores are totaled. In accordance with one exemplary embodiment, an AML score less than 49 receives a low risk rating, an AML score of 50-100 receives a medium risk rating, an AML score of 100-375 receives a medium/high risk rating, and an AML score greater than 375 receives a high risk rating.

In addition, eKYC database 140 is suitably configured to store client information including, but not limited to, client contact information, business profile, regulatory status, ownership and management information, AML score, and/or any other information that may positively or negatively affect a risk assessment of an entity. For example, eKYC database 140 may include information that "John Doe" is a majority stockholder of Financial Institution A, and that Mr. Doe's brother in-law was recently indicted on money laundering charges. In another example, eKYC database 140 may include information relating to potential political unrest and/or a governmental change in the country where the headquarters of Financial Institution A is located. The suite, in one exemplary embodiment, includes a client business management information system (CBMIS) database 150. CBMIS database 150 is any hardware and/or software suitably configured to store and/or display data regarding the revenue of the customer, as input by an RM.

In another exemplary embodiment, the suite includes a client profitability system large area network (CPS LAN) 160. CPS LAN 160 is any hardware and/or software suitably configured to store and/or display data related to the profitability of a customer. In one embodiment of the invention, CPS LAN 160 is configured to store and display current profits (or losses) and past profits (or losses) for a customer, along with projected future profits (or losses).

Within system 100, in an exemplary embodiment, application server 120 (portal 125) is in communication with eCR database 130 (including credit rating database 132, exposure database 134, and/or intelligence database 136), eKYC database 140, CBMIS database 150, and/or CPS LAN 160 via a network 190. Network 190 includes, for example, any electronic means which incorporates communication hardware and/or software components. Communication among the devices in accordance with the present invention may be accomplished through any suitable communication channels, such as, for example, a telephone network, an extranet, an intranet, Internet, point of interaction device (point of sale device, personal digital assistant, cellular phone, kiosk, etc.), online communications, satellite communications, off-line communications, wireless communications, transponder communications, local area network (LAN), wide area network (WAN), networked or linked devices, keyboard, mouse and/or any suitable communication or data input modality. Moreover, although the invention is frequently described herein as being implemented with TCP/IP communications protocols, the invention may also be implemented using IPX, Appletalk, IP-6, NetBIOS, OSI or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference. Moreover, system 100 contemplates the use, sale or distribution of an item or information over any network having similar functionality described herein.

Figure 2:
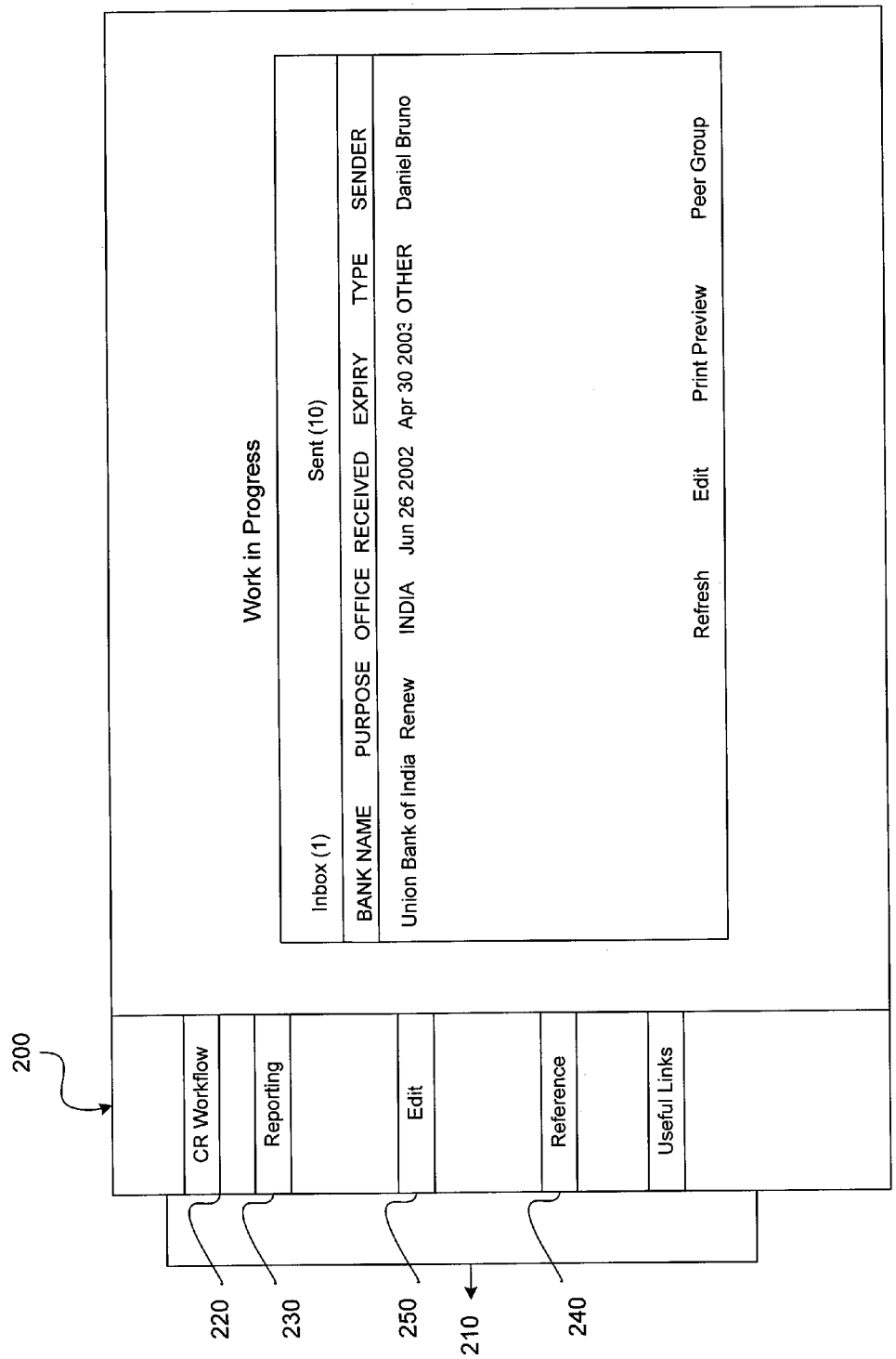

FIGS. 2 and 3 illustrate various screen shots and features of eCR database 130. FIG. 2 illustrates one exemplary Work In Process Screen (WIPS) 200 included as at least a portion of eCR database 130. In one embodiment, WIPS 200 is the first screen to appear when opening a credit application for a customer. In another embodiment, WIPS 200 acts as an "in box" such that names of customers appearing on WIPS 200 require some action (e.g., concur, dissent, approve, disapprove, etc.). In yet another embodiment, the number of credit reports a user (e.g., user 105) has approved is shown on WIPS 200. WIPS 200 includes a navigation tool bar 210 which includes, for example, a Credit Report Workflow link 220, a Reporting link 230, an Edit link 240, a Reference link 250, and/or any other link (e.g., "Useful Links") capable of assisting a user in accessing information relevant to issuing credit to a customer.

FIG. 3 illustrates an exemplary Data Entry Screen (DES) 300 included as at least a portion of eCR database 130. In the embodiment illustrated in FIG. 3, DES 300 is an electronic credit report (eCR) form. DES 300 may also include a Client Screen having various information fields (e.g., "Client Level Request", "Group Level Request", and/or "Percentage Held" fields). These fields are generally for information purposes only, however, they may be used for other appropriate purposes (e.g., to guide credit approver through the information, provide explanation about changes in the credit, etc.). "Client Level Request" and "Group Level Request" fields are generally used when a parent customer credit report is being processed to propose a change in Group credit limits. "Percentage Held" fields include parent customer ownership percentages and may appear as a whole number in a Group Limit Report (not shown).

DES 300, in one embodiment, is a Facilities Screen configured to store and/or display information pertaining to a customer's credit line. The Facilities Screen includes, for example, fields showing existing facility amounts when a user (e.g., user 105) inputs a new credit limit, and fields showing a prior credit limit. DES 300 may also include a Comments Screen wherein Business Justification Comments and/or Business Justification plus Suitability Statements are required for a customer having, for example, an operational risk rating (ORR) score of 5 and below.

The ORR score is intended to reflect the overall risk profile of a borrower or guarantor, and is based on a scale of 1-10, with 1 reflecting the lowest risk. The rating is generally based on the long-term foreign currency debt ratings from one or more rating agencies (e.g., Standard & Poors, Moodys, and Fitch Global Financial and Rating). Other criteria that may affect the ORR score include, but are not limited to, country stability, regulatory environment, competitive position, balance sheet strength, and management and control.

In a further embodiment of the invention, DES 300 is a Financials Screen wherein, if a customer is included in credit rating database 132, a Standard Summary and/or Detailed Financial Report is made available by default (including interim data, if available). The financial data is updated, for example, on a weekly or other appropriate periodic basis. In addition, the default reports can be overwritten, as needed, and additional data or reports may be included or attached as the default report. If a customer is not included in credit rating database 132, a financial report may be generated and inserted into the Financials Screen.

In yet another embodiment of the invention, DES 300 is an Analysis Screen configured to store and/or display analysis of the data gathered, wherein the data relates to the customer seeking credit. The Analysis Screen includes analysis directly input into eCR database 130, or analysis copied and pasted from an existing word document. In still another embodiment, DES 300 is an Approval Screen configured to store and/or display approval information for a customer. The Approval Screen displays, for example, a level (e.g., high, medium, low, etc.) of approval, all signatories to the credit limit, date of concurrence, and/or approval status. DES 300 may additionally be a Ratings Screen configured to store and/or display the external and internal rating of individual customers. In one embodiment, if a customer is included in credit rating database 132, the Ratings Screen is configured to periodically import (e.g., electronically) the latest credit rating database 132 rating of the customer. The Ratings Screen imports the credit rating database 132 rating on, for example, a weekly, biweekly, monthly, quarterly, semiannual, annual, and/or on any other appropriate periodic basis. The Ratings Screen may also be configured to automatically import (e.g., electronically), the Moody's and S&P ratings. Other embodiments require that the Moody's and S&P ratings be input manually, for example, if a customer is not included in credit rating database 132.

DES 300, in another embodiment, is a Group Limits Screen configured to import and display Group member limits from individual Facility Screens. The Group member limits are displayed on the Group Limits Screen as, for example, an aggregated limit of the sum of Group member limits plus any unallocated limits. The Group Limits Screen, in addition to the aggregated limit, may also display each individual limit imported from the Facilities Screen(s). In another embodiment (e.g., where a Group maximum exists which is less than the aggregated limit), a global relation manager (GRM) may manually overwrite the proposed limit. In this manner, the proposed limit may represent the maximum limit. As such, editing rights to the Group unallocated limit and proposed limit may be limited to the GRM only.

In a further embodiment, DES 300 is an Allocations Screen configured to import and display limit and sub-limit data from at least one Facility Screen. The limit and sub-limit data is automatically or manually imported from a Facility Screen. In one embodiment, a user (e.g., user 105) "drops down" a menu on the Allocations Screen and selects a branch then allocates an amount of credit. After inputting an amount of credit, user 105 clicks anywhere on the screen to show the input values. If sub-limits exceed the maximum credit limit, eCR database 130 allows user 105 to allocate sub-limits within a risk class to a single office (e.g., location of business owner). When a limit is changed on the Facilities Screen, for example, via the Allocations Screen, each allocation for that particular class of limit is "refreshed" and re-entered for accuracy.

FIG. 4 illustrates an exemplary screen shot and features of a standard KYC form 400 according to an embodiment of the invention. In accordance with various exemplary embodiments of the invention, standard KYC form 400 may include any inquiries required by law and/or required by the policies of the entity operating system 100, and is typically used for each customer. As such, the content of standard KYC form 400 may change according to the jurisdiction in which the customer conducts business and/or the jurisdiction governing the entity operating system 100. In one embodiment, standard KYC form 400 includes inquiries such as, for example, entity/currency restrictions, pending/past regulatory violations, the customers written policies and/or procedures, type of products, services, and customer base of the customer, and/or any other inquiry that may affect the credit worthiness of the customer.

Figure 5:
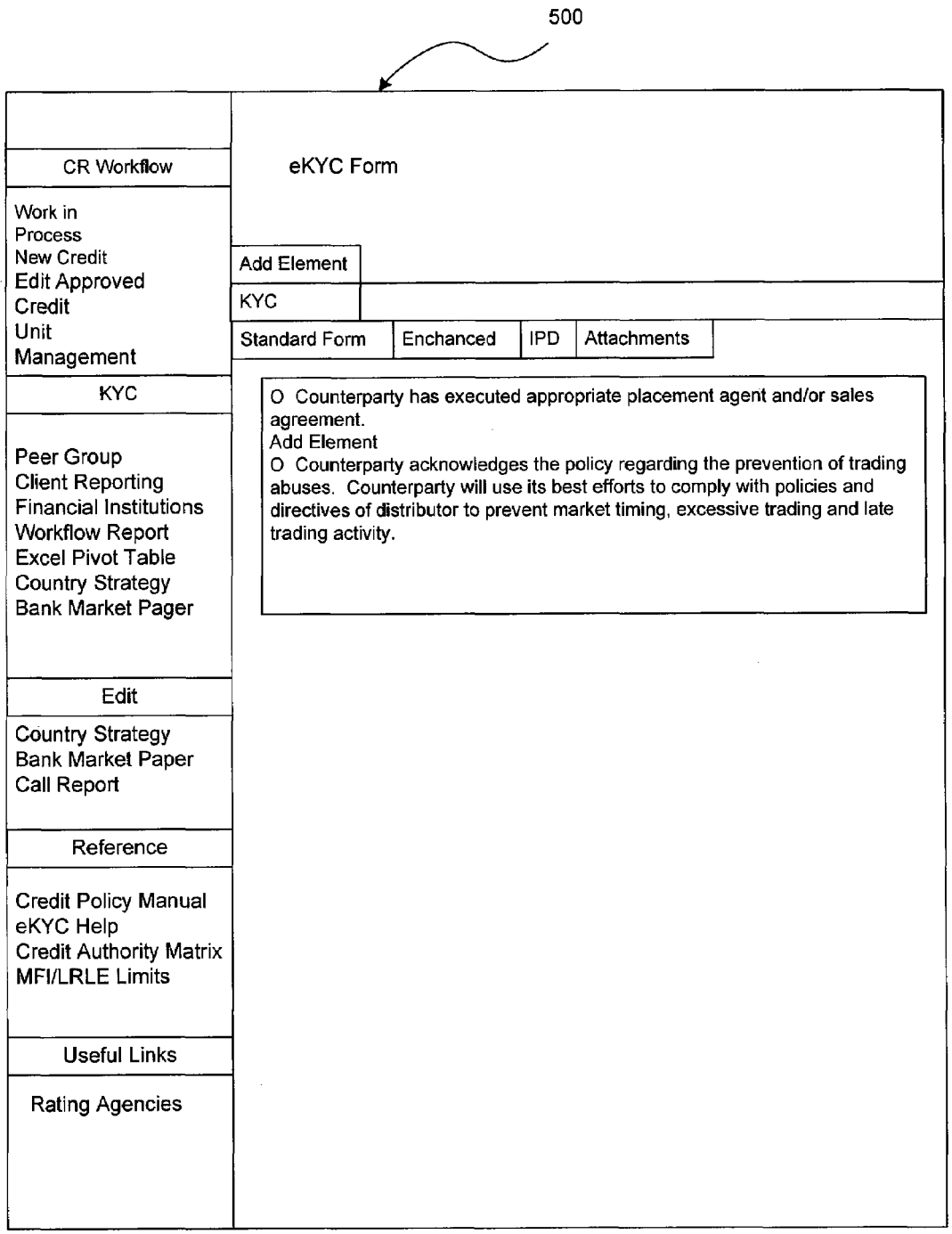
FIG. 5 illustrates an exemplary screen shot of an enhanced KYC form.

FIG. 5 illustrates an exemplary screen shot and features of an enhanced KYC form 500, which may be completed in addition to the standard KYC form. In one embodiment, enhanced KYC form 500 includes information/data not generally required to be completed by the entity operating system 100. As such, enhanced KYC form may include any additional inquiries deemed important to the entity operating system 100. Furthermore, enhanced form 500 may only be utilized for certain classes/categories (e.g., high risk and/or high-medium risk) of customers, certain industries, countries, and the like.

Figure 6:
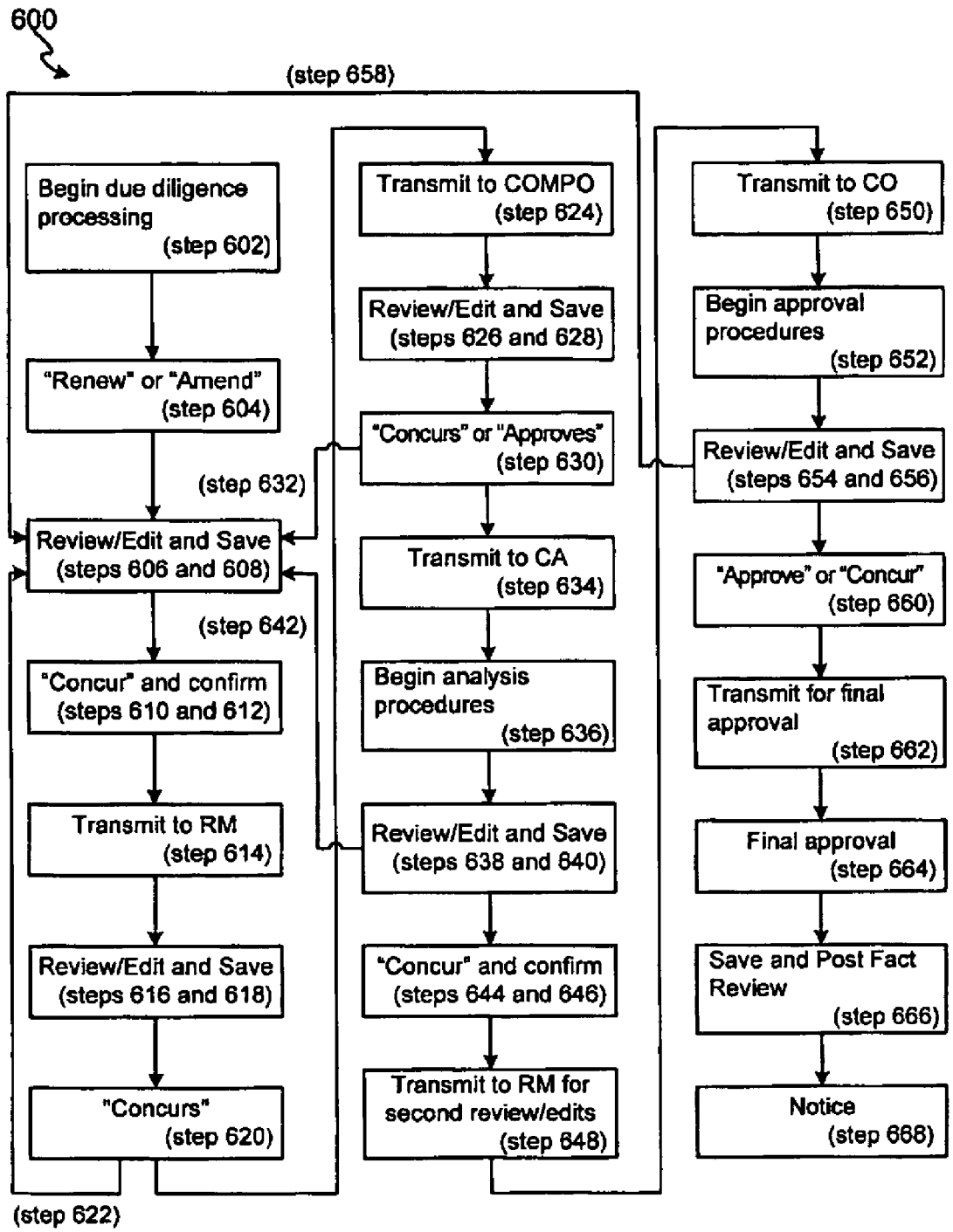
FIG. 6 is a flow diagram of an exemplary method to process a credit request from an existing customer according to an embodiment of the invention.

FIG. 6 is a flow diagram illustrating an exemplary method 600 for processing a due diligence report from an existing customer. In an exemplary embodiment, method 600 is performed when a member of Compliance/Credit Utility (MCCU) begins the due diligence process relating to a credit request (step 602). After login, the MCCU begins the due diligence process by opening a WIPS (e.g., WIPS 200) for a customer in an eKYC database (e.g., eKYC database 140). To locate a customer to renew/amend, the MCCU selects an "Edit Approved Credit" link from a tool bar included on WIPS 200. A search for a customer may be undertaken using single or multiple criteria (e.g. RM, Country of Risk, Expiration Date, etc.). By default, expiration date fields generate a search for a customer having credits expiring over, for example, the next two months, or any other appropriate time period. Other embodiments of the invention may require that the default be deleted if not required for the search.

From a list of customers generated by the search, the MCCU chooses the name of a customer and actuates a "Renew" (e.g., scheduled annual credit renewal) link or an "Amend" (e.g., interim amendment or short term credit request) link (step 604). This action associates the due diligence report with a "Work in Process" (WIP) status. The customer's name remains in WIPS until the MCCU "approves" or "concurs" the report, which moves the report to another "in box" or deletes the name from WIPS 200.

After the MCCU has actuated the "Renew" or "Amend" link, the MCCU reviews and/or edits the report in at least one Data Entry Screen (e.g., DES 300) (step 606). The MCCU reviews and/or edits any appropriate screen(s), and may input data in, for example, a Client Screen, Facilities Screen, MCCU Comments Screen, Financials Screen, Analysis Screen Approval Screen, Ratings Screen, Group Limits Screen, and/or Allocation Screen. In addition, the MCCU accesses one or more of eCR database 130, CBMIS 150, and CPS LAN 160 via portal 125 to gather information in deciding the appropriate edits. In appropriate embodiments (e.g., when integrated with eCR database 130), the MCCU may additionally access credit rating database 132, exposure database 134, and/or intelligence database 136 to gather information when deciding the appropriate edits. When reviewing and/or editing process is sufficiently complete, the MCCU saves the data in each screen the MCCU edited (step 608). Once the data is saved, the MCCU "concurs" (approves) the due diligence report (step 610) at which time eKYC database 140 confirms that a due diligence report has been concurred (step 612).

In an exemplary embodiment (e.g., when the credit issued is a stand alone credit (i.e., not part of a Group)), eKYC database 140 transmits the customer's information to a WIPS "in box" of a Relations Manager (RM) (step 614). The RM reviews and/or edits the credit report information in DES(s) 300, which was reviewed and/or edited by the MCCU (step 616). When the RM is finished, the RM saves the data (step 618) and "concurs" the request (step 620). If the RM has further questions/concerns, the RM returns the credit report to the MCCU to request further information/clarification, and steps 606 through 620 may be repeated as needed (step 622).

The RM then transmits the report to a WIPS "in box" of a Compliance Officer (COMPO) (step 624).

The COMPO reviews and/or edits the report information in DES(s) 300 (step 626). When the COMPO is finished, the COMPO saves the data (step 628) and "concurs" or "approves" the report (step 630), depending on the COMPO's authority. If the COMPO has further questions/concerns, the COMPO returns the report to the MCCU to request further information/clarification, and the system may repeat steps 606 through 630 as needed (step 632). The COMPO then transmits the report to a WIPS "in box" of a Credit Analyst (CA) (step 634).

The CA further processes the customer's request for credit by beginning analysis procedures (step 636) which includes the CA reviewing and/or editing the credit information in DES(s) 300 which was reviewed and/or edited by the MCCU (step 638). The CA may review and/or edit any appropriate screen(s), and may be directly responsible for inputting data in, for example, a Client Screen, Facilities Screen, Comments Screen, Financials Screen, Analysis Screen, Approval Screen, Ratings Screen, Group Limits Screen, and/or Allocation Screen similar to the MCCU discussed above. A Peer Group Comparative Report may be compiled automatically from the data input in DESs 300 and from a credit rating database 132 financial feed. The CA views a Customer Market Paper including an analysis of the market (e.g., industry type, country, etc.) in which the customer operates. Furthermore, the CA accesses one or more of eKYC database 140, CBMIS 150, and CPS LAN 160 via portal 125 to gather information in deciding the appropriate edits. In appropriate embodiments (e.g., when integrated with eCR database 130), the CA additionally accesses credit rating database 132, exposure database 134, and/or intelligence database 136 to gather information when deciding the appropriate edits. When finished reviewing and/or editing, the CA saves the data (step 640). If the CA has further questions/concerns, the CA returns the credit report to the MCCU to request further information/clarification, and the system may repeat steps 606 through 640 as needed (step 642). The CA returns the credit report by actuating a "RETURN" button of WIPS 200. The CA provides the details in an "Approval Comments" field found on the Approval Screen. Once the CA finalizes the data, the CA "approves" or "concurs" the credit report (step 644) at which time eCR database 130 confirms that a credit has been concurred (step 646).

From the CA, the credit report is returned to the RM for the RM to review and/or edit the credit report information a second time (step 648). When finished, the RM transmits the credit report to a WIPs "in box" of a Credit Officer (CO) (step 650). The CO further processes the customer's request for credit by beginning approval procedures (step 652) which includes, for example, the CO reviewing and/or editing the credit information in the DES(s) 300 which was reviewed and/or edited by the MCCU, RM (twice), COMPO, and the CA, the Peer Group Comparative Report, the Customer Market Paper, and/or a Country Strategy Paper detailing the investment strategies related to the customer's country (step 654). The CO reviews and/or edits any appropriate screen(s) and Paper/Reports, and may input data in such areas. Furthermore, the CO accesses one or more of eKYC database 140, CBMIS 150, and CPS LAN 160 via portal 125 to gather information in deciding what edits to make, if any. In appropriate embodiments (e.g., when integrated with eCR 130), the CO additionally accesses credit rating database 132, exposure database 134, and/or intelligence database 136 to gather information when deciding the appropriate edits. When finished reviewing and/or editing, the CO saves the report (step 656). Furthermore, the CO may return the credit report to the MCCU, RM, COMPO, and/or CA to request further information/clarification, and steps 606 through 656 may be repeated as needed (step 658). After the CO is satisfied with the report, the CO "approves" or "concurs" the report depending on his credit authority (step 660).

In one embodiment, the CO transmits the information to the "in box" of a higher credit authority (e.g., a regional and/or national CO) for final review and approval (step 662). The CO provides final approval (step 664) and reports may be approved individually from DES 300 or in bulk (e.g., on a Peer Group Report). In another embodiment, the CO actuates an "APPROVE" button included on WIPS 200. Once approved, a credit is automatically saved to an Approved Credit database and notice is transmitted (e.g., via email) to all persons in the approval chain, Financial Institutions Group and Financial Market Services mailboxes for branches listed on Allocation Report, and/or a higher credit authority for Post Facto Review (step 666). Post Facto Review includes the next higher credit authority receiving notice indicating that a specific due diligence report has been approved (step 668). In embodiments of the invention where the notification is through email, the email may include a link to eCR database 130 such that the higher credit authority may view the customer's data.

System 100 may include credit limit expiration wherein the customer's pre-existing credit limit expires after a pre-determined period of time. A procedure for appeal and/or extension may be provided. Likewise, a denial of approval at any step of method 600 may also include an appropriate appeal process. Thus, method 600 contemplates that any person (e.g., the MCCU, RM, COMPO, CA, CO, and higher authority) in the approval process has access (via portal 125) to the same information provided on eCR database 130 (including credit rating database 132, exposure database 134, and/or intelligence database 136), eKYC 140, CBMIS 150, and/or CPS LAN 160.

Figure 7:
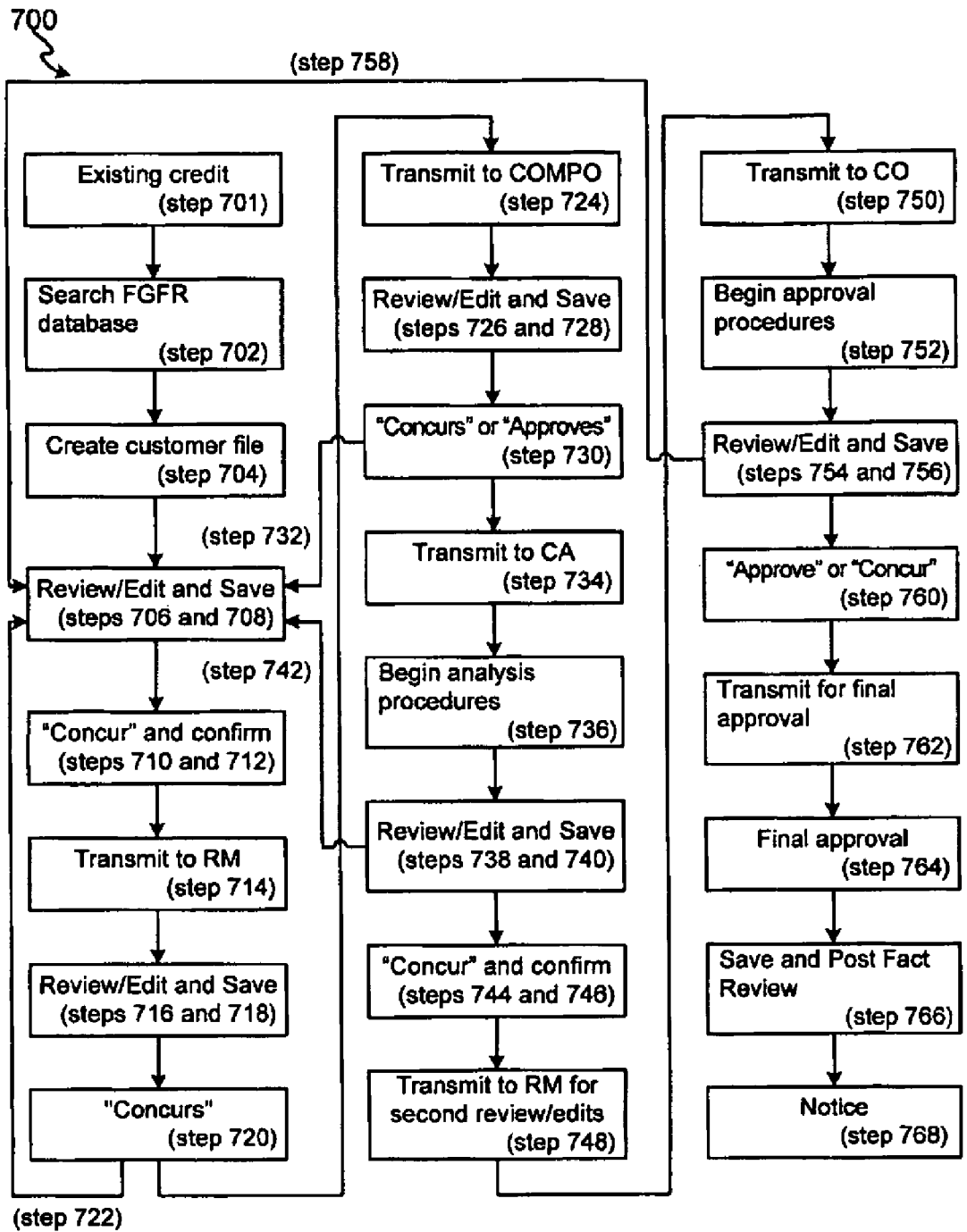
FIG. 7 is a flow diagram of an exemplary method for processing a credit request from a new customer according to an embodiment of the invention.

FIG. 7 illustrates an exemplary method 700 to process a due diligence report from a new customer requesting a credit. Method 700 initiates when a MCCU determines that credit does not already exist for the customer (step 701). When the MCCU determines that credit does not already exist, the MCCU searches credit rating database 132 (by the customer's country) to gather the customer's financials and Fitch rating (step 702). The MCCU uses the information to create a customer file for the customer by actuating a "New Customer" link (step 704). The customer file includes the data the MCCU gathered, and creating a customer file provides the customer (the due diligence report) with a WIP status similar to embodiments discussed above. After the MCCU has actuated the "New Customer" link, the MCCU reviews and/or edits the credit information in at least one Data Entry Screen (e.g., DES 300). In an exemplary embodiment, method 700 includes steps 708 through 768 similar to steps 608 through 668, respectively. Thus, in one embodiment, method 700 contemplates that each person (e.g., the MCCU, RM, COMPO, CA, CO, and higher authority) to the approval process has access (via portal 125) to the same information provided on eCR database 130 (including credit rating database 132, exposure database 134, and/or intelligence database 136), eKYC database 140, CBMIS 150, and/or CPS LAN 160.

Figure 8:
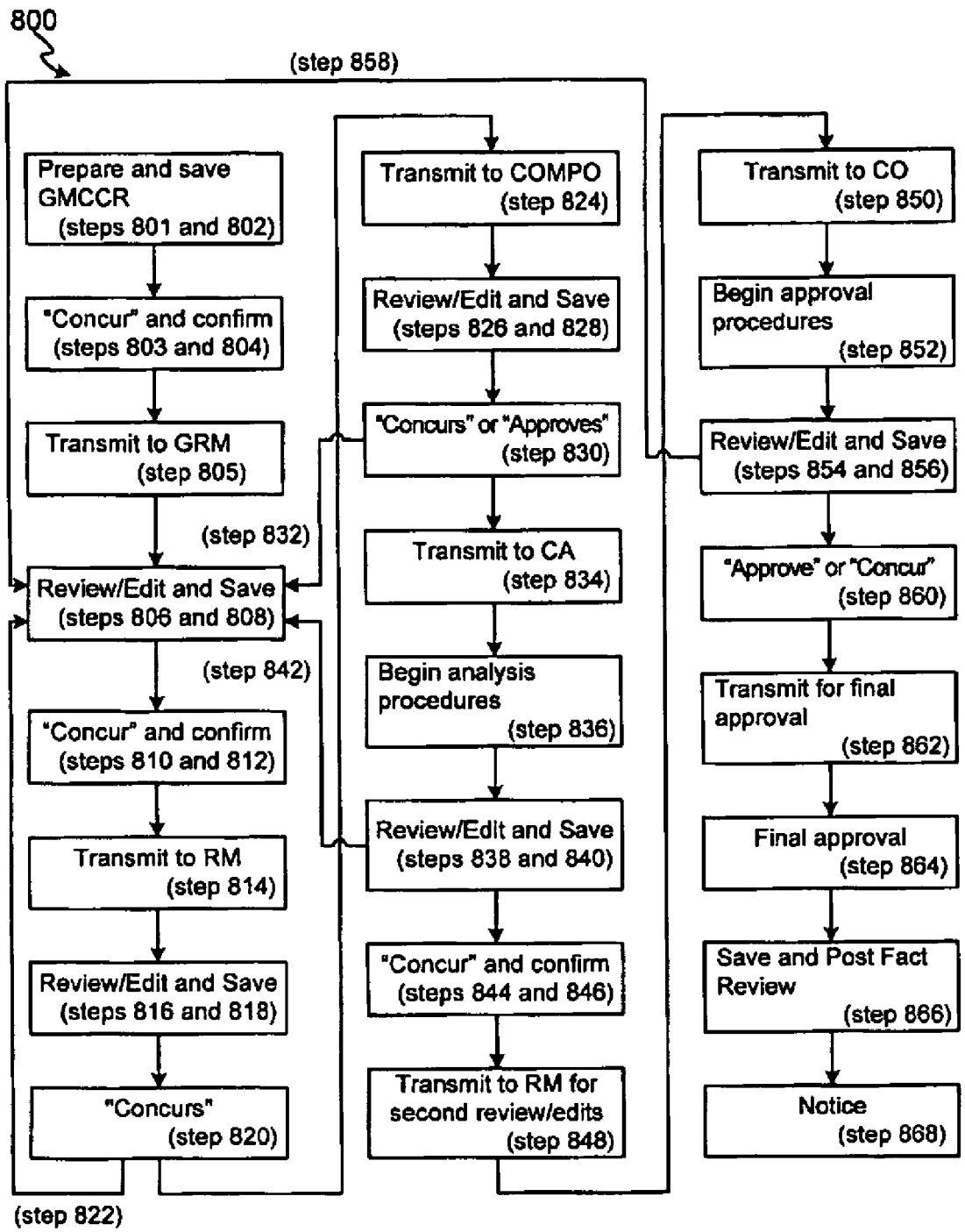
FIG. 8 is a flow diagram of an exemplary method for processing a credit request from a customer Group according to an embodiment of the invention.

FIG. 8 illustrates an exemplary method 800 to process a due diligence report including a credit request from a customer Group. When an RM prepares (step 801) and saves (step 802) a Group Member Customer Credit Request (GM-CCR), if sufficient Group Limits are available, a Group Report immediately updates to reflect limits requested. If insufficient Group Limits exist, any amendment(s) will not save, and the RM may contact a Global Relations Manager (GRM) to request either an increase in Group Limits or an accommodation within a restrictive Group maximum cap. The RM and/or GRM may add and/or delete members from a Group, and add and/or delete a Group, as needed.

The GMCCR is transmitted to the "in box" of a GRM (step 805) when the RM "concurs" the report (step 803) and the report is confirmed (step 804) similar to embodiments discussed above. Next, the GRM accesses a Parent Customer due diligence report, and reviews and/or edits the Group Unallocated limit and maximum credit limit for the Group (step 806) before saving any edits (step 808). The GRM may edit the Group Unallocated limit and maximum credit limit (i.e., adjust the limit up or down) for the Group in manner similar to the editing processes discussed above. If the GMCCR cannot be accommodated within the existing Group Limits, the GRM may, for example, (1) decline the limit increase request, (2) reduce the limit of another Group member, (3) request an increase in the Group Limit, and/or (4) allow the Group to operate within a new Group maximum credit.

The GMCCR is transmitted to CA's "in-box" (step 814) after the GRM "concurs" (step 810) the edits, and the edits have been confirmed (step 812) similar to embodiments discussed above (step 814). Method 800 may include steps 816 through 868 similar to steps 716 through 768 and steps 616 through 668, respectively. Thus, method 800 contemplates that each person (e.g., the LRM, GRM, RM, COMPO, CA, CO, and higher authority) to the approval process has access (via portal 125) to the same information provided on eCR database 130 (including credit rating database 132, exposure database 134, and/or intelligence database 136), eKYC database 140, CBMIS 150, and/or CPS LAN 160.

Notably, various databases used herein may include, for example, client data; merchant data; financial institution data; and/or like data useful in the operation of system 100. As those skilled in the art will appreciate, a user computer may include an operating system (e.g., Windows NT, 95/98/2000, OS2, UNIX, Linux, Solaris, MacOS, etc.) as well as various conventional support software and drivers typically associated with computers. The computer may also include any suitable personal computer, network computer, workstation, minicomputer, mainframe or the like. A user computer may be in a home or business environment with access to a network. In an exemplary embodiment, access is through a network or the Internet through a commercially available web-browser software package.

Any databases discussed herein may be any type of database, such as relational, hierarchical, graphical, object-oriented, and/or other database configurations. Common database products that may be used to implement the databases include DB2 by IBM (White Plains, N.Y.), various database products available from Oracle Corporation, (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in preselected databases or data sectors.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type.

However, data tables having similar, though not identical, data in the key fields may also be linked by using AGREP, for example. In accordance with one embodiment of the present invention, any suitable data storage technique may be utilized to store data without a standard format. Data sets may be stored using any suitable technique, including, for example, storing consumer files using an ISO/IEC 7816-4 file structure; implementing a domain whereby a dedicated file is selected that exposes one or more elementary files containing one or more data sets; using data sets stored in consumer files using a hierarchical filing system; data sets stored as records in a single file (including compression, SQL accessible, hashed via one or more keys, numeric, alphabetical by first tuple, etc.); Binary Large Object (BLOB); stored as unGrouped data elements encoded using ISO/IEC 7816-6 data elements; stored as unGrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a BLOB. Thus, any binary information can be stored in a storage space associated with a data set. As discussed above, the binary information may be stored on the financial payment instrument or external to but affiliated with the financial payment instrument. The BLOB method may store data sets as unGrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the financial payment instrument by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments of the present invention, the data can be stored without regard to a common format. However, in one exemplary embodiment of the present invention, the data set (e.g., BLOB) may be annotated in a standard manner when provided for manipulating the data onto the financial payment instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain consumers, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a stand alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the payment instrument user at the stand alone device, the appropriate option for the action to be taken. The present invention may contemplate a data storage arrangement wherein the header or trailer, or header or trailer history, of the data is stored on the payment instrument in relation to the appropriate data.

One skilled in the art will also appreciate that, for security reasons, any databases, systems, devices, servers or other devices of system 100 may consist of any combination thereof at a single location or at multiple locations, wherein each database or system includes any of various suitable security features, such as firewalls, access codes, encryption, decryption, compression, decompression, and/or the like.

System 100 may be described herein in terms of functional block components and various processing steps. It should be appreciated that such functional blocks may be realized by any number of hardware and/or software components configured to perform the specified functions. For example, system 100 may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that the present invention may employ any number of conventional techniques for data transmission, signaling, data processing, network control, and the like. Still further, system 100 may be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As will be appreciated by one of ordinary skill in the art, system 100 may be embodied as a customization of an existing system, an add-on product, upgraded software, a stand-alone system, a distributed system, a method, a data processing system, a device for data processing, and/or a computer program product. Accordingly, system 100 may take the form of an entirely software embodiment, an entirely hardware embodiment, or an embodiment combining embodiments of both software and hardware. Furthermore, system 100 may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The present invention is described herein with reference to block diagrams and flowchart illustrations of methods, apparatus (e.g., systems), and computer program products according to various embodiments of the invention. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, functional blocks of the block diagrams and flow diagram illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, web pages, websites, web forms, prompts, etc.

Practitioners will appreciate that the illustrated steps described herein may comprise in any number of configurations including the use of windows, web pages, web forms, popup windows, prompts and the like. It should be further appreciated that the multiple steps as illustrated and described may be combined into single web pages and/or windows but have been expanded for the sake of simplicity. In other cases, steps illustrated and described as single process steps may be separated into multiple web pages and/or windows but have been combined for simplicity.

Benefits, other advantages, and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of any or all the claims or the invention. Further, no element described herein is required for the practice of the invention unless expressly described as "essential" or "critical".

What is claimed is:

1. A portal system configured to integrate financial information resources, comprising: an application server including a portal, wherein said portal comprises a link to at least two of an electronic credit report (eCR) database, an electronic know your customer (eKYC) database, a client business management information system (CBMIS), and a customer profitability system large area network (CPS LAN);

an anti-money laundering (AML) scoring server configured to retrieve risk information of an organization from at least one of: said electronic credit report (eCR) database, said electronic know your customer (eKYC) database, said client business management information system (CBMIS), and said customer profitability system large area network (CPS LAN), wherein said risk information includes a first branch and a second branch, and wherein said first branch is geographically separated from said second branch;

said AML scoring server configured to independently analyze risk inquiries based upon said risk information, said risk inquiries relating to said first branch and second branch, wherein said plurality of risk inquiries include political ownership information, political environment information, and at least one of customer information, regulatory information, management information, geographic location information, financial performance information, economic information or ownership information;

said AML scoring server configured to independently calculate risk scores for each of said risk inquiries relating to said at least one of: said first branch and second branch, wherein said risk scores are based upon weightings assigned to each of said risk inquiries;

said AML scoring server configured to independently calculate an AML scores for at least one of: said first branch and said second branch based on summing said risk scores associated with each of said risk inquiries; and, a web server coupled to said application server to facilitate access to said portal system for users to obtain said AML scores.

2. The portal system of claim 1, wherein said portal comprises a link to each of said eCR database, said eKYC database, said CRMIS, and said CPS LAN.

3. The portal system of claim 2, wherein said application server comprises said eCR database, wherein said eCR database comprises a link to at least one of an exposure database, a credit rating database, and an intelligence database.

4. The portal system of claim 3, wherein said portal comprises a link to said eCR database and a portal to said eKYC database, wherein said eKYC database comprises said AML scoring module and at least one of: a standard KYC form and an enhanced KYC form.

5. The portal system of claim 4, wherein said portal comprises a first link to said eCR database and a second link to said eKYC database, wherein:

said eCR database comprises a third link to at least one of an exposure database, a credit rating database, and an intelligence database, and said KYC database comprises said AML scoring module and at least one of a standard KYC form and an enhanced KYC form.

6. The portal system of claim 5, wherein said portal comprises a first link to said eCR database and a second link to said eKYC database, wherein:

said eCR database comprises a third link to at least one of an exposure database, a credit rating database, and an intelligence database, and said KYC database comprises said AML scoring module and at least one of a standard KYC form and an enhanced KYC form, wherein said AML scoring module is configured to calculate said AML scores based upon at least one user input and produce a risk classification.

7. The portal system of claim 6, wherein said portal comprises a first link to said eCR database and a second link to said eKYC database, wherein:

said eCR database comprises a third link to at least one of an exposure database, a credit rating database, and an intelligence database, and said KYC database comprises said AML scoring module and at least one of a standard KYC form and an enhanced KYC form, wherein said AML scoring module is configured to calculate said AML scores based upon at least one user input and produce a risk classification, wherein said risk classification comprises a high, high-medium, medium, medium-low, and low classification.

8. The portal system of claim 7, wherein said portal system facilitates access to substantially the same information by said users.

9. The portal system of claim 8, wherein said portal system facilitates access to substantially the same information by said users, and said information is stored in a customer file on said application server.

10. The portal system of claim 9, wherein said portal system facilitates access to substantially the same information by said users, and said information facilitates at least one of credit approval and Know Your Customer (KYC) approval for a customer and, wherein said at least one of: said credit approval and said KYC approval is used to determine whether to extend credit to said customer.

11. The portal system of claim 10, wherein said portal system facilitates access to substantially the same information by said users, and said information facilitates Know Your Customer (KYC) approval, wherein said KYC approval comprises approval from at least one manager from within said users.

12. A computer-implemented method for facilitating improved risk assessment and business reporting comprising said steps of: providing access to a first user, via a portal on a platform of said computer, to financial information resources relating to a first branch and a second branch of an organization, wherein said first branch is geographically separated from said second branch, wherein said financial information resources comprise at least two of an electronic credit report (eCR) database, a electronic know your customer (eKYC) database, a client business management information system (CBMIS), and a customer profitability system large area network (CPS LAN);

retrieving, by said computer and from said financial information sources, risk information relating to said first branch and said second branch from said financial information sources;

sorting, by said computer, said risk information among risk inquiries independently relating to said first branch and said second branch, wherein said plurality of risk inquiries include political ownership information, political environment information, and at least one of customer information, regulatory information, management information, geographic location information, financial performance information, political environment information, economic information or ownership information;

calculating, by said computer, risk scores for each of said risk inquiries independently relating to said first branch and said second branch wherein said risk scores are based upon weightings assigned to each of said risk inquiries;

calculating, by said computer, an AML scores for said first branch and said second branch based on summing said risk scores associated with each of said risk inquiries;

storing, by said computer, said AML scores in a file of said first user; and forwarding said file to a second user.

13. The computer-implemented method of claim 12, further comprising said steps of:

providing access, via said portal, to said financial information resources associated with said first branch and said second branch to said second user;

receiving, by said computer, further information associated with said first branch and said second branch from said second user; and storing, by said computer, said further information in said file.

14. The computer-implemented method of claim 13, further comprising said steps of:

providing access, via said portal, to said financial information resources associated with said first branch and said second branch to said second user;

receiving, by said computer, further information associated with said first branch and said second branch from said second user;

storing, by said computer, said further information in said file; and forwarding said file storing said information and said further information to a third user.

15. A computer readable medium, tangibly embodied with instructions which, when executed by a computer, perform the steps comprising:

providing access to a first user, via a portal on a platform of said computer, to financial information resources relating to a first branch and a second branch, wherein said first branch is geographically separated from said second branch, and wherein said financial information resources comprise at least two of an electronic credit report (eCR) database, a electronic know your customer (eKYC) database, a client business management information system (CBMIS), and a customer profitability system large area network (CPS LAN);

retrieving, by said computer and from said financial information sources, risk information relating to said first branch and said second branch;

sorting, by said computer, said risk information among a risk inquiries independently relating to said first branch and said second branch, wherein said plurality of risk inquiries include political ownership information, political environment information, and at least one of customer information, regulatory information, management information, geographic location information, financial performance information, economic information or ownership information;

calculating, by said computer, risk scores for each of said plurality of said risk inquiries independently relating to said first branch and said second branch, wherein said risk scores are based upon weightings assigned to each of said risk inquiries;

calculating, by said computer, AML scores for said first branch and said second branch based on summing said risk scores associated with each of said risk inquiries;

storing, by said computer, each of said AML scores in a file of said first user; and forwarding said file to a second user.

16. The portal system of claim 11, wherein said customer information includes an institution type, whether a client premises was visited, whether a compliance check was performed, whether a customer is a new customer, and length of relationship with said customer.

17. The portal system of claim 16, wherein said regulatory information includes suspicious activity reporting, whether a license was granted, license status, legal status, who collaborated said license status, products, services, customer base, and regulatory enforcement action.

18. The portal system of claim 17, wherein said management information includes comments on background of senior management.

19. The portal system of claim 18, wherein said ownership information includes group structure, bank ownership, non-bank ownership, major ownership changes, and public trading information.

20. The portal system of claim 19, wherein said first branch includes at least one of: a first headquarter, a first regional outpost, a first department, or a first subsidiary, and wherein said second branch includes at least one of: a second headquarter, a second regional outpost, a second department, or a second subsidiary.

\* \* \* \* \*

UNITED STATES PATENT AND TRADEMARK OFFICE
CERTIFICATE OF CORRECTION

| | |
|---|---|
| PATENT NO. | : 7,593,892 B2 |
| APPLICATION NO. | : 11/163081 |
| DATED | : September 22, 2009 |
| INVENTOR(S) | : Balk et al. |

Page 1 of 1

It is certified that error appears in the above-identified patent and that said Letters Patent is hereby corrected as shown below:

In Column 21, Line 22, please delete "political environment information".

Signed and Sealed this

Third Day of November, 2009

David J. Kappos
*Director of the United States Patent and Trademark Office*